S. TROOD.
SAFETY DEVICE FOR STARTING MOTORS.
APPLICATION FILED MAR. 1, 1913. RENEWED DEC. 16, 1914.
1,130,041.
Patented Mar. 2, 1915.
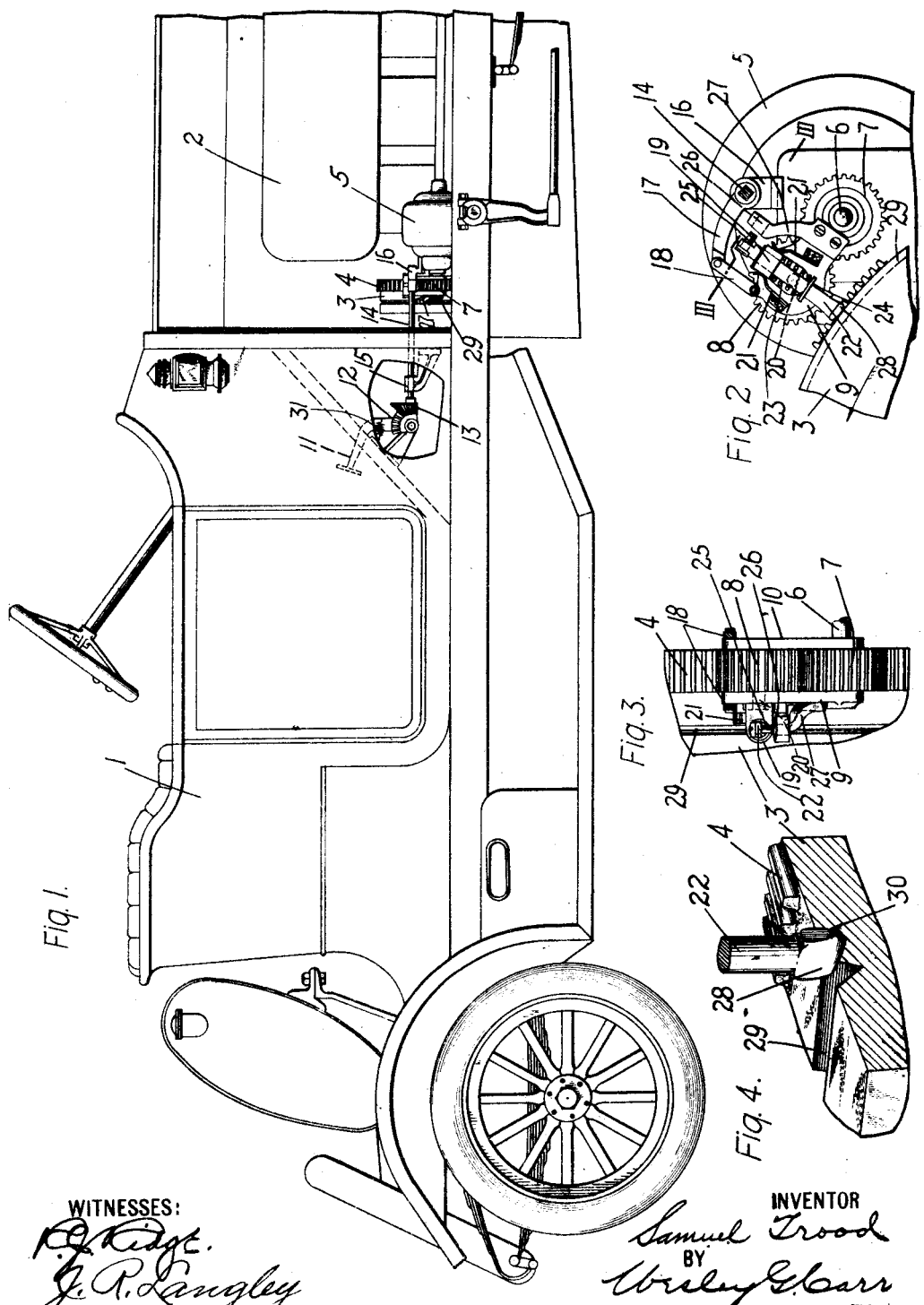
WITNESSES:
INVENTOR
Samuel Trood
BY
Wiley G. Carr
ATTORNEY

UNITED STATES PATENT OFFICE.

SAMUEL TROOD, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

SAFETY DEVICE FOR STARTING-MOTORS.

1,130,041.   Specification of Letters Patent.   Patented Mar. 2, 1915.

Application filed March 1, 1913, Serial No. 751,428. Renewed December 16, 1914. Serial No. 877,614.

*To all whom it may concern:*

Be it known that I, SAMUEL TROOD, a citizen of the United States, and a resident of Edgewood Park, in the county of Allegheny and State of Pennsylvania, have invented a new and useful Improvement in Safety Devices for Starting-Motors, of which the following is a specification.

My invention relates to a safety device for starting motors and it has for its object to provide a structure for protecting the gear mechanism of a starting motor by preventing the connection of the motor to the engine shaft of an automobile, or other motor vehicle, while the engine shaft is rotating.

In the use of starting motors in connection with gas engines of automobiles, it is customary to employ reduction gearing of a comparatively high-speed ratio between the motor and the engine shaft. In case the flywheel is utilized as one of the gears, it rotates with a high peripheral speed when the engine operates under its own power. An attempt to mesh a motor-driven pinion or gear with the flywheel gear when the engine is running, is likely to damage the gear mechanism by causing "stripping" of the teeth. It is necessary, therefore, to prevent the engagement of the connecting gears when the speed is excessive.

My invention consists, broadly, in providing a member which engages the flywheel in advance of the pinion and which, in case the flywheel is rotating, automatically acts to positively prevent the further actuation of the pinion toward the flywheel.

The details of my invention are described in connection with the accompanying drawing in which—

Figure 1 is a side view of an automobile, parts being broken away. Fig. 2 is an enlarged end view of a portion of the flywheel and the starting mechanism. Fig. 3 is a sectional view on line III—III of Fig. 2. Fig. 4 is an enlarged detail view, in perspective, of a portion of the flywheel and an engaging member.

The automobile 1 is provided with the usual gas engine 2 and a flywheel 3 having gear teeth 4 formed on a portion of its periphery. A starting motor 5, which may be an electric motor, a fluid pressure motor, or any other kind of suitable motor, is operatively connected, at starting, to the flywheel 8 by the motor shaft 6 having a fixed pinion 7 which meshes with a pinion 8 rotatably mounted between two plates 9 and 10. The plates 9 and 10 are pivotally supported by the shaft 6 and are adapted to move the pinion 8 in mesh with the flywheel gear teeth 4 and, at the same time, to maintain intermeshing relation between the pinions 7 and 8. The operation of the plates 9 and 10 is controlled by a pedal 11 that is placed within convenient reach of the operator and carries a bevel gear segment 12 to mesh with a second bevel gear segment 13 fixed on the rear end of a rock shaft 14. The rock shaft 14 is mounted in brackets 15 and 16 and carries a lever arm 17 that is connected to the plates 9 and 10 by links 18.

A guide block 19 has a pivotal support at 20 on the plate 9 and is normally held in the position shown in Fig. 2 by springs 21 which press against its opposite sides. A pin 22 is slidably mounted in a suitable opening in the block 19 in a position radial to the flywheel and is normally retained in the position shown by a compression spring 23 between the block 19 and a collar 24 on the pin 22. At the outer end of the pin 22, is mounted a transverse locking pin 25 which is adapted to enter a recess 26 in an arm 27 attached to the plate 9 when the pin 22 and block 19 are rocked on the pivot 20. The inner end of the pin 22 is provided with a wedged shaped dog 28 which projects beyond the circumference of the pinion 8 and is adapted, under certain conditions hereinafter described, to engage an annular groove 29 in the periphery of the flywheel in advance of the meshing of the pinion 8 with the flywheel gear teeth 4.

When it is desired to start the engine, the operator presses the pedal 11 forwardly and the shaft 14 is rocked by the bevel gear segments 12 and 13 to cause the lever arm 17 to turn the plates 9 and 10 about the motor shaft 6 and thus move the pinion 8 toward the flywheel. The dog 28 first engages the groove 29 and a further movement of the plate members 9 and 10 causes the block 19 to slide on the pin 22 and compress the spring 23 until the teeth of the pinion 8 mesh with the gear teeth 4. The motor 5 is supplied with motive power from any suitable source and the engine shaft, not shown, is rotated to start the engine. The rotation of the flywheel in the direction of the arrow, Fig. 2, rocks the pin 22 and block 19 on the pivot 20 until the pin 25 engages the arm 27, whereupon the dog 28 slides in the groove 29. The dog 28 is provided with curved edges 30 which render the wedging engagement with the groove 29 very slight when the pin is in an inclined position compared with that when in a radial position. When the engine starts under its own power, the operator releases the pedal 11 which is retracted by a tension spring 31, connected to any suitable stationary part of the vehicle, and the parts are returned to the inoperative position.

If the operator should press the pedal 11 while the engine is running and the flywheel is rotating, the pinion 8 is prevented from engaging the gear teeth 4 because the pin 22 and the block 19 are turned on the pivot 20 instantly upon the engagement of the pin 22 with the groove 29 of the rapidly rotating flywheel and the locking pin 25 enters the recess 26 and locks the arm 27 and the plate 9 against movement relative to the pin 22, thus preventing further movement of the pinion 8. Upon the release of the pedal, the various parts will be returned to their normal inoperative positions.

It is not necessary for the successful operation of my invention that the engine should be operating under its own power to rotate the flywheel at a high rate of speed because the safety mechanism operates to lock the pinion out of connection with the flywheel at any speed of the latter which is sufficient to injure the teeth of the gear wheels.

From the foregoing description and explanation, it may be readily understood that I have provided a simple means for positively preventing damage to the gear mechanism of a starting motor on account of a mistake or an inadventence on the part of the operator.

I claim as my invention:—

1. In a starting mechanism, the combination with two gear members, of means for shifting one of said members laterally into and out of mesh with the second member, and means carried by said shifting means for preventing the shifting of said first member into mesh with the second member when said second member is rotating.

2. In a starting mechanism, the combination with two gear members mounted in substantially the same plane, of means for shifting one of said gear members into operative and inoperative position with respect to the other gear member, and means for preventing the shifting of said first gear member from an inoperative position when said second gear member is rotating.

3. In a starting mechanism, the combination with two gear members mounted in the same plane, of means for shifting one of said members into and out of operative connection with the other member, and mechanical means for automatically preventing the shifting of said first member into operative connection when the said second member is rotating.

4. In a starting system, the combination with a gear mechanism comprising a shiftable gear member having an operative and an inoperative position, and a movable support for said member, of an element pivotally and slidably mounted on said support, and means carried by said support and said element for locking said member in an inoperative position.

5. In a starting system, the combination with an engine shaft, a starting motor, and gear mechanism for operatively connecting said motor to said shaft, of means for shifting one member of said mechanism laterally into and out of mesh with a second member, and means for preventing the shifting of said first member into mesh with said second member when said engine shaft is rotating.

6. In a starting mechanism, the combination with an engine shaft, a starting motor, and gear members for operatively connecting said motor to said shaft, of means for shifting one of said gear members into and out of operative connection with a second gear member and maintaining an operative connection with a third gear member, and means for automatically locking said first gear member in its inoperative position when said engine shaft is rotating.

7. In a starting mechanism, the combination with two gear members, of means for shifting one of said gear members laterally into and out of mesh with the second gear member, and means whereby a partial movement of said shifting means, when said second member is rotating, automatically locks said first gear member out of mesh with said second gear member.

8. A starting mechanism, comprising a gear member, a second gear member shiftable into and out of operative connection with said first member, an arm supporting said shiftable member, a slidable pin having a pivotal support on said arm, a dog on said pin which engages said first member before said members are in operative connection, and locking means on said pin and said arm for holding said second member out of operative connection with said first member.

In testimony whereof, I have hereunto subscribed my name this 18th day of February, 1913.

SAMUEL TROOD.

Witnesses:
B. B. HINES,
M. C. MERZ.